United States Patent [19]
Holm

[11] Patent Number: 4,863,519
[45] Date of Patent: Sep. 5, 1989

[54] METHOD OF MAKING BLOCKS, BEAMS, PIPES AND BUILDING ELEMENTS THAT CAN BE SAWN AND NAILED

[76] Inventor: Harry Holm, Box 1166, Helsingborg, Sweden

[21] Appl. No.: 98,727

[22] Filed: Sep. 15, 1987

Related U.S. Application Data

[63] Continuation of Ser. No. 817,747, Jan. 17, 1986, abandoned.

[30] Foreign Application Priority Data

Mar. 21, 1984 [WO] PCT Int'l Appl. .................. PCT/SE84/00102

[51] Int. Cl.$^4$ ....................... C04B 15/02; C04B 41/28
[52] U.S. Cl. ...................................... 106/97; 428/404; 428/407; 106/86; 106/87; 264/45.1; 264/128
[58] Field of Search ............................. 106/97, 86, 87; 428/404, 407; 264/45.1, 54, 128

[56] References Cited

U.S. PATENT DOCUMENTS

| | | | |
|---|---|---|---|
| 4,010,232 | 3/1977 | Labreque | 428/312.4 |
| 4,086,098 | 4/1978 | Le Ruyet et al. | 106/97 |
| 4,607,061 | 8/1986 | Schmidt | 521/122 |

FOREIGN PATENT DOCUMENTS 7901145 8/1980 Sweden .

OTHER PUBLICATIONS

Derwent Abstract #82-54107E/26-abstract for Swedish Application 7901145 previously cited.

Primary Examiner—William R. Dixon, Jr.
Assistant Examiner—David M. Brunsman
Attorney, Agent, or Firm—Holman & Stern

[57] ABSTRACT

A method of manufacturing a lightweight building element comprises providing a lightweight aggregate of particles having diameters in the range of 2 mm to 20 mm, mixing the particles together to produce graduated particle size distribution of the mixture, adding a quick-setting binder to the mixture in a predetermined amount sufficiently small so that free spaces are produced between the particles after setting and drying, allowing the binder to set and dry to form a porous body of particles bound together by the binder and having free spaces between the particles, introducing expanding plastic into the free spaces, and expanding the plastic in situ to form a cellular plastic structure completely filling the free spaces.

19 Claims, 1 Drawing Sheet

METHOD OF MAKING BLOCKS, BEAMS, PIPES AND BUILDING ELEMENTS THAT CAN BE SAWN AND NAILED

This is a continuation of application Ser. No. 817,747, filed 1/17/86, now abandoned.

CROSS REFERENCE TO RELATED APPLICATION(S)

This United States application stems from PCT International Application No. PCT/SE84/00102 filed Mar. 21, 1984.

The present invention relates to a method making a composite building material suitable for lightweight building structures and satisfying the demands for improved utilization in the building industry.

DESCRIPTION OF THE PRIOR ART

Combining lightweight aggregate and cellular plastic for building structures is previously known. The lightweight aggregate is bonded with cellular plastic instead of cement, use being made of a coarser particle size fraction, from 10 to 30 mm. However, these materials have been unable to provide the requisite fire resistance. In the event of a fire, the cellular plastic burns away and the lightweight aggregate is exposed and gradually falls apart, whereupon the fire can penetrate deeper into the structure. Furthermore, these building materials are subjected to heavy deformation under compressive loads before rupture occurs, and their usefulness therefore is limited.

BRIEF SUMMARY OF THE INVENTION

The present invention obviates these shortcomings in that the aggregate particles are first bonded with cement, gypsum or a combination of these binders. It is possible to use particle size fractions having a diameter from as small as 2 mm to higher values, such as 20 mm, in different particle size combinations. The wide range of useful particle size fractions makes it possible to broaden the production program.

DETAILED DESCRIPTION

The particles are first bonded together so that an external porosity is obtained therebetween, i.e., the particles are bonded together with voids between the particles to form a porous body and then polyurethane or other cellular plastic is introduced into the voids to form a cellular structure between the particles to obtain, a material which does not have the negative properties of a product consisting solely made in accordance with the method of lightweight aggregate and cellular plastic.

Lightweight aggregate is intended to include calcined, expanded clay (expanded fire clay) or calcined expanded shale, eruptively formed compositions, pumice and similar materials. Quick-setting binder is intended to include cement, gypsum and mixtures thereof, or similar binders. The invention is useful in any structural form, such as blocks, beams, pipes and panels for example.

A typical building element is manufactured by mixing the lightweight aggregate with a quick-setting binder which binds the particles of the aggregate together. The particle size diameters should be large, such as in the range of 2-20 mm, and may be graduated, e.g. the aggregate may be a mixture of particles having diameters of 2-4, 2-5, 2-8, 3-8, 4-10, 10-16, and 12-20 mm. The amount of the binder is small in order to obtain a free external porosity wherein essentially free spaces are provided between the particles. When the binder is set and dry, an expanding plastic such as polyurethane is introduced into the voids between the particles which expands to fill the voids with a cellular material.

A particle size fraction from 2 to 4 mm, or from 2 to 8 mm, makes it possible to produce panelling elements having a thickness of about 12 mm and in the same dimensions as gypsum panels. The surface layers of the panels may consist of paper, glass fibers, thin sheet metal, mortar etc., and the panels may have a volumetric weight of about 400 kg/m$^3$, i.e. at 12 mm thickness a weight of about 5 kg/m$^3$. The particle size fraction however is in the range of 2 to 20 mm in diameter.

The space between two panelling elements may be injected with an insulating polyurethane layer, or a different cellular plastic having a higher insulation resistance than the panelling elements may be glued in position within said space, whereby a highly insulated structure is obtained.

It is, of course, also possible to produce larger reinforced structures for outer walls, floors and ceilings.

Lightweight aggregate blocks can be produced with a reduced amount of binder in block-making machine, and after setting and drying, for example, polyurethane is injected into these blocks. The blocks are then provided with a suitable number of holes which do not extend all the way through the block. The polyurethane is injected into these holes. By suitable positioning of these holes, the entire block can be thoroughly injected with polyurethane.

The invention has been described above with reference to the production of building materials. It is, however, also possible to produce doors, window frames, reinforced boat hulls, etc., by the invention. Building elements of this invention have the advantages that they can be sawed and nailed, despite the presence of plastic they have good fire resistance, under compressive load they show no appreciable deformation prior to failure, the amount of binder required is minimized, and they can be economically manufactured.

What I claim and desire to secure by Letters Patent is:

1. In a method of manufacturing a lightweight building element of aggregate bound together by a binder to form a body having free external spaces between the aggregate wherein the spaces are free of binder, the improvement comprising:

providing a lightweight aggregate of particles having a graduated particle diameter in the range of 2 mm to 20 mm and a graduated particle size distribution;

adding a quicksetting binder to said aggregate of graduated diameter particles in an amount sufficiently small so that free external spaces are produced between the particles after setting and drying;

allowing said binder to set and dry to form a porous body of particles bound together by said binder and having said free external spaces between said particles to provide free external porosity;

introducing an expanding plastic into said free external spaces; and expanding said plastic in situ to form a cellular plastic structure completely filling said free spaces.

2. A method as claimed in claim 1 wherein said aggregate comprises clay.

3. A method as claimed in claim 2 wherein said clay comprises calcined, expanded clay.

4. A method as claimed in claim 3 wherein said binder comprises cement.

5. A method as claimed in claim 4 wherein said plastic comprises polyurethane.

6. A method as claimed in claim 3 wherein said binder comprises gypsum.

7. A method as claimed in claim 3 wherein said binder comprises a mixture of cement and gypsum.

8. A method as claimed in claim 1 wherein said aggregate comprises shale.

9. A method as claimed in claim 8 wherein said shale comprises calcined, expanded shale.

10. A method as claimed in claim 1 wherein said aggregate comprises pumice.

11. A method as claimed in claim 1 wherein said binder comprises cement.

12. A method as claimed in claim 1 wherein said binder comprises gypsum.

13. A method as claimed in claim 1 wherein said plastic comprises polyurethane.

14. A method as claimed in claim 1 wherein said aggregate comprises a mixture of particles having a size range of 2 mm to 4 mm.

15. A method as claimed in claim 1 wherein said aggregate comprises a mixture of particles having a size range of 10 mm to 16 mm.

16. A method as claimed in claim 1 wherein said aggregate comprises a mixture of particles having a size range of 12 mm to 20 mm.

17. A method as claimed in claim 1 wherein:
said aggregate comprises clay;
said binder comprises cement; and
said plastic comprises polyurethane.

18. The method as claimed in claim 1 and further comprising:
producing a plurality of holes in said porous body after said setting and drying of the binder which forms said porous body; and wherein
said step of introducing an expanding plastic further comprises injecting said expanding plastic into said holes.

19. A method as claimed in claim 18 wherein:
said aggregate comprises clay;
said binder comprises cement; and
said plastic comprises polyurethane.

* * * * *